US012258798B2

(12) United States Patent
Yang

(10) Patent No.: US 12,258,798 B2
(45) Date of Patent: Mar. 25, 2025

(54) DOOR STOP ROD ASSEMBLY

(71) Applicant: Yao-Kun Yang, Taichung (TW)

(72) Inventor: Yao-Kun Yang, Taichung (TW)

( * ) Notice: Subject to any disclaimer, the term of this patent is extended or adjusted under 35 U.S.C. 154(b) by 230 days.

(21) Appl. No.: 18/105,217

(22) Filed: Feb. 2, 2023

(65) Prior Publication Data

US 2023/0184013 A1 Jun. 15, 2023

Related U.S. Application Data

(63) Continuation-in-part of application No. 16/941,538, filed on Jul. 29, 2020, now abandoned.

(51) Int. Cl.

*E05C 17/16* (2006.01)
*E05B 45/06* (2006.01)
*E05C 17/30* (2006.01)
*E05C 19/00* (2006.01)

(52) U.S. Cl.

CPC ............ *E05C 17/166* (2013.01); *E05B 45/06* (2013.01); *E05C 17/30* (2013.01); *E05C 19/004* (2013.01); *E05B 2045/0615* (2013.01)

(58) Field of Classification Search

CPC ........ E05C 17/166; E05C 17/30; E05C 17/02; E05C 17/44; E05C 17/54; E05C 19/00; E05C 19/003; E05C 19/004; E05C 19/18; E05C 19/184; E05C 19/186; E05C 19/188; E05B 45/06; E05B 2045/0625; E05B 2045/063; E05B 2045/064; E05B 2045/065; E05B 2045/067; E05B 2045/0675; E05B 2045/068; E05B 2045/0615; Y10T 292/23; Y10T 292/34; Y10T 292/37; Y10T 292/379; Y10T 292/388; Y10T 292/65; Y10T 292/67; Y10S 292/15; Y10S 292/65; A45B 3/00; A45B 3/12

See application file for complete search history.

(56) References Cited

U.S. PATENT DOCUMENTS 3,862,556 A * 1/1975 Moses ..................... E05B 13/04 70/416
4,036,518 A * 7/1977 Jost ....................... E05C 19/004 292/339

(Continued)

FOREIGN PATENT DOCUMENTS

KR 101324537 B1 * 11/2013 ............. E05C 17/02
WO WO-2006076818 A1 * 7/2006 ........... A44B 15/005

OTHER PUBLICATIONS

Waybach machine archived web page for https://theorycircuit.com/door-knob-touch-alarm-circuit/ from Feb. 15, 2019, 4 pages (Year: 2019).*

*Primary Examiner* — Gilbert Y Lee
*Assistant Examiner* — Peter H Watson

(57) ABSTRACT

A door stop rod assembly includes a base having a room defined therein. A neck and a yoke are respectively connected to two opposite ends of the base. The collapsible part is connected to the neck. The yoke includes a notch against which the door knob contacts. A warning device is located in the room of the base and includes a circuit, a power supply, a buzzer, a vibration detector, a static electricity sensor and a switch. When the vibration detector detects vibration from the door knob due to exterior touch of the door knob, the circuit activates the buzzer to warn the persons inside the house.

4 Claims, 9 Drawing Sheets

(56) References Cited

U.S. PATENT DOCUMENTS

| | | | | | |
|---|---|---|---|---|---|
| 4,971,374 | A * | 11/1990 | Lovell | E05C 21/00 | 292/288 |
| 5,335,949 | A * | 8/1994 | Maury | F16B 7/105 | 403/328 |
| 5,482,070 | A * | 1/1996 | Kelly | A61H 3/02 | 135/66 |
| 5,752,415 | A * | 5/1998 | Tsai | B25G 1/04 | 16/429 |
| 5,787,548 | A * | 8/1998 | Tzen | A01G 17/10 | 292/338 |
| 7,030,758 | B1 * | 4/2006 | Markegard | E05C 19/004 | 292/338 |
| 7,164,356 | B1 * | 1/2007 | Zeitz | G08B 13/08 | 292/338 |
| 2003/0206103 | A1 * | 11/2003 | Morrone | E05B 65/0888 | 340/545.1 |
| 2012/0279538 | A1 * | 11/2012 | Chen | E05C 19/18 | 292/289 |
| 2018/0148960 | A1 * | 5/2018 | Finley | E05C 19/003 | |
| 2020/0040624 | A1 * | 2/2020 | Workman | E05C 19/004 | |

* cited by examiner

DOOR STOP ROD ASSEMBLY

BACKGROUND OF THE INVENTION

1. Fields of the Invention

The present invention is a Continuation-In-Part patent application of applicant's former patent application Ser. No. 16/941,538, and relates to a door stop rod assembly with a warning device connected thereto which activates a buzzer when vibration is detected.

2. Descriptions of Related Art

There are different types of anti-theft countermeasures for doors, and the most common one is the door knob. However, the door knob is easily unlocked and the key for the door knob may be lost. Once the key is lost, the door cannot be opened. Even worse, if the key is stolen, the property in the house may be took away or people in the house are easily bothered or harassed. Therefore, many people install door stop rods on the inner side of the door to protect the safety of people and property indoors.

Taiwanese utility model patent No. M413011 discloses a door stop rod which can also be used as a crutch to provide better functionality. Taiwanese utility model patent No. M367224 discloses a door stop rod that is convenience for storage.

U.S. Pat. Nos. 4,971,374, 5,482,070, 5,752,415 and KR 101324537 respectively disclose a door stop rod with different features and structures.

Applicant noted that the conventional door stop rods have desired anti-theft features, once the door stop rods are removed, there will be no way to warn the owners or even the neighbors to take further action to make the thefts give up and leave.

The present invention intends to provide a door stop rod assembly that includes a warning device which activates a buzzer so as to eliminate the shortcomings mentioned above.

SUMMARY OF THE INVENTION

The present invention relates to a door stop rod assembly, and comprises a base having a room defined therein. A neck and a yoke are respectively connected to two opposite ends of the base. A cut-out is defined in one side of the base. A recess is formed in the inner bottom of the room. Two slots are formed to two sides of the periphery of the cut-out. A collapsible part includes an inner tube and an outer tube. The first end of the inner tube is retractably inserted into the outer tube, and the second end of the inner tube is connected to the neck of the base. A locking pin includes a boss and a ring. The boss protrudes beyond the periphery of the locking pin. The ring is connected to one end of the locking pin. The locking pin extends through the inner tube and the neck. The inner tube is located between the boss and the ring. Multiple ridges extend axially from the outer periphery of the neck. The second end of the inner tube includes a passage defined axially therein. Multiple grooves are defined axially in the inner periphery of the passage. The ridges of the neck are slidably received in the grooves of the inner tube. A biased pin is located in the inner tube and has an end piece protruding through the outer periphery of the inner tube. The outer tube has multiple first holes and second holes defined through the wall thereof. The first holes are arranged in a first row, and the second holes are arranged in a second row which is parallel to the first row of the first holes. The second holes are located alternatively between the first holes. The end piece of the biased spring protrudes through one of the first and second holes. The yoke includes two extensions, and each of the two extensions is pivotably connected to the yoke by a pivot. Each extension is connected to a torsion spring so that the two extensions normally pivot toward each other.

A warning device is located in the room of the base and includes a circuit, a power supply, a buzzer, a vibration detector and a switch. The circuit is formed on a disk which is accommodated in the recess. The switch has a base board which is inserted into the two slots of the cut-out. When the vibration detector detects vibration from the door knob that the yoke is engaged, the buzzer is activated to buzz.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
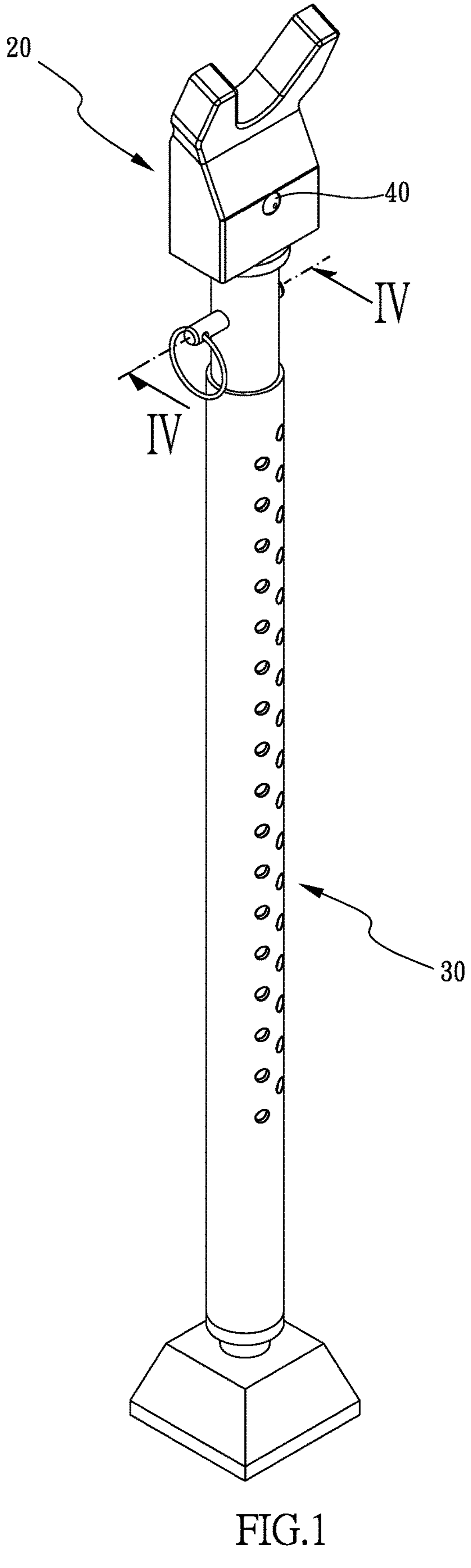
FIG. 1 is a perspective view to show the door stop rod assembly of the present invention.
Figure 2:
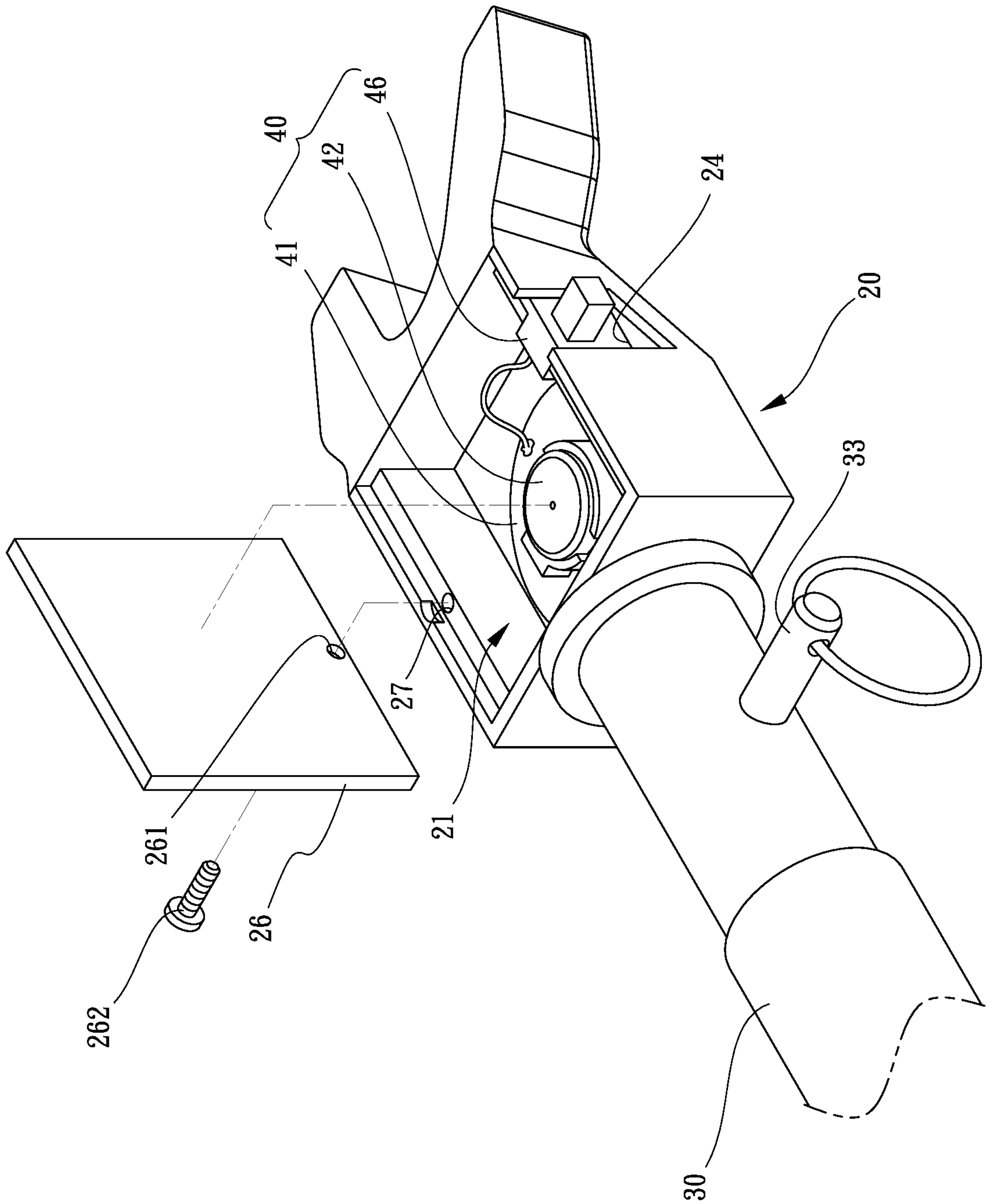
FIG. 2 shows that cover to be connected to the base of the door stop rod assembly of the present invention.

Referring to FIGS. 1 to 9, the door stop rod assembly of the present invention comprises a base 20 having a room 21 defined therein. A recess 211 is formed in the inner bottom of the room 21. A neck 22 extends from the first end of the base 20, and a yoke 23 is connected to the second end of the base 20. A cut-out 24 is defined in one side of the base 20, and two slots 241 are formed to two sides of the periphery of the cut-out 24. A collapsible part 30 includes an inner tube 31 and an outer tube 32, wherein the first end of the inner tube 31 is retractably inserted into the outer tube 32, and the second end of the inner tube 31 is connected to the neck 22 of the base 20. A locking pin 33 includes a boss 331 and a ring 332. The boss 331 protrudes beyond the periphery of the locking pin 33. The ring 332 is connected to one end of the locking pin 33. The locking pin 33 extends through the inner tube 31 and the neck 22, such that the inner tube 31 is located between the boss 331 and the ring 332 and does not drop from the locking pin 33. Multiple ridges 221 extend axially from the outer periphery of the neck 22. The second end of the inner tube 31 includes a passage 311 defined axially therein. Multiple grooves 312 are defined axially in the inner periphery of the passage 311 so that the ridges 221 of the neck 22 are slidably received in the grooves 312 of the inner tube 31. A biased pin 313 is located in the inner tube 31 and has an end piece protruding through the outer periphery of the inner tube 31. The outer tube 32 has multiple first holes 321 and second holes 322 defined through the wall thereof. The first holes 321 are arranged in a first row, and the second holes 322 are arranged in a second row which is parallel to the first row of the first holes 321. The second holes 322 are located alternatively between the first holes 321. The end piece of the biased spring 313 protrudes through one of the first and second holes 321, 322 so as to set the length of the collapsible part 30. The yoke 23 includes two extensions 232, and each of the two extensions 232 is connected to the yoke 23 by a pivot 233. Each extension 232 is connected to a torsion spring 234 so that the two extensions 232 normally pivot toward each other by the torsion springs 234.

The warning device 40 is located in the room 21 of the base 20 and includes a circuit 41, a power supply 42, a buzzer 43, a vibration detector 44 and a switch 46. The circuit 41, the power supply 42, the buzzer 43, the vibration detector 44 and the switch 46 are electrically connected to each other. The circuit 41 is formed on a disk 411 which is accommodated in the recess 211. The switch 46 has a base board 461 which is inserted into the two slots 241 of the cut-out 24. When the vibration detector 44 detects vibration from a door knob 11, the buzzer 43 is activated to buzz.

Figure 9:
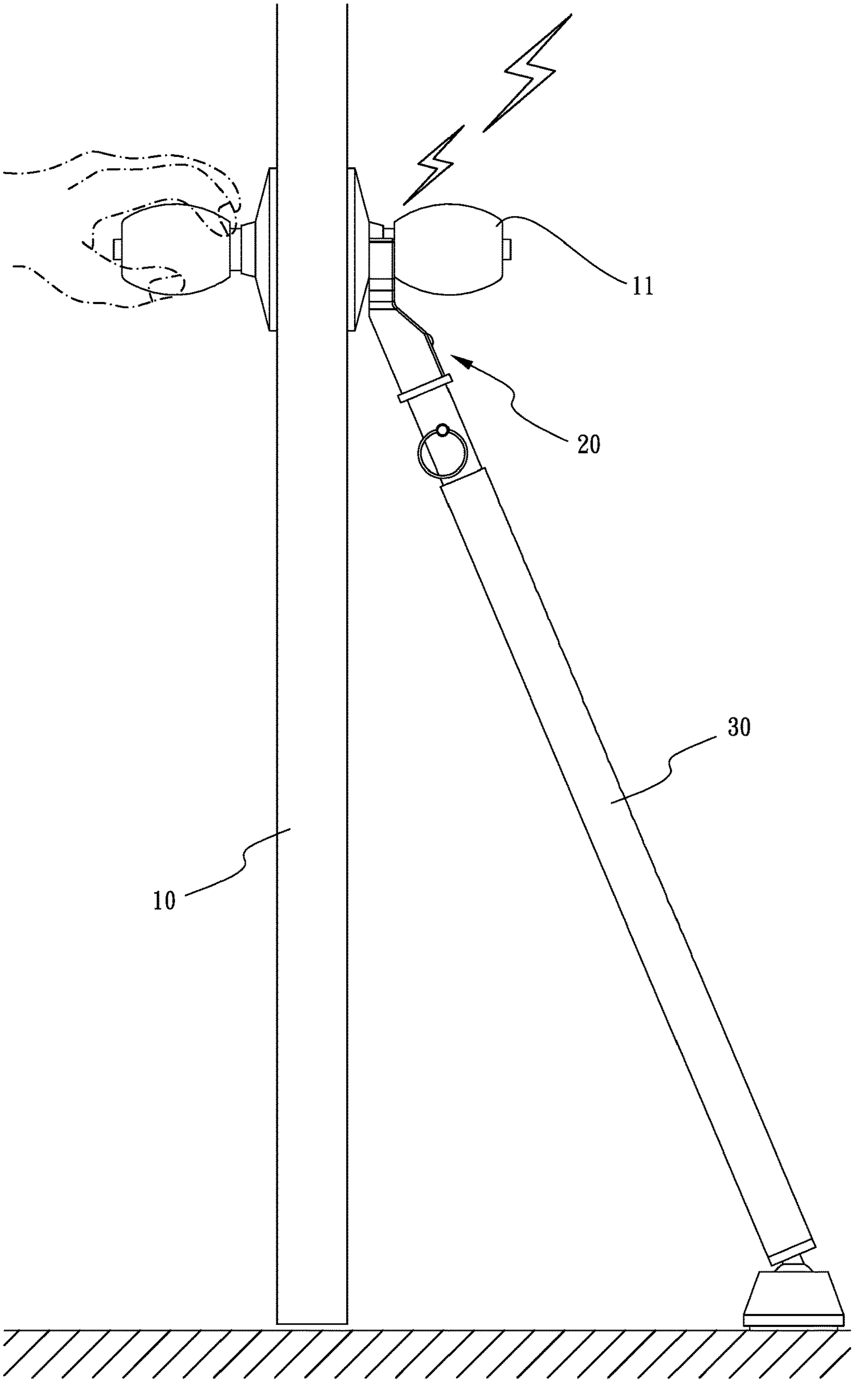
FIG. 9 shows the door stop rod assembly of the present invention is used to secure a door knob.

When in use, as shown in FIG. 9, the door knob 11 is engaged with the yoke 23 of the base 20, the outer tube 32 is connected with a foot which contacts against the floor so that the door 10 cannot be opened from outside. When an unauthorized person tries to open the door 10 from outside of the door 10, the vibration detector 44 of the warning device 40 detects the vibration and the circuit 41 activates the buzzer 43 to buzz. Therefore, the persons in the room are acknowledged and have time to response.

Figure 7:
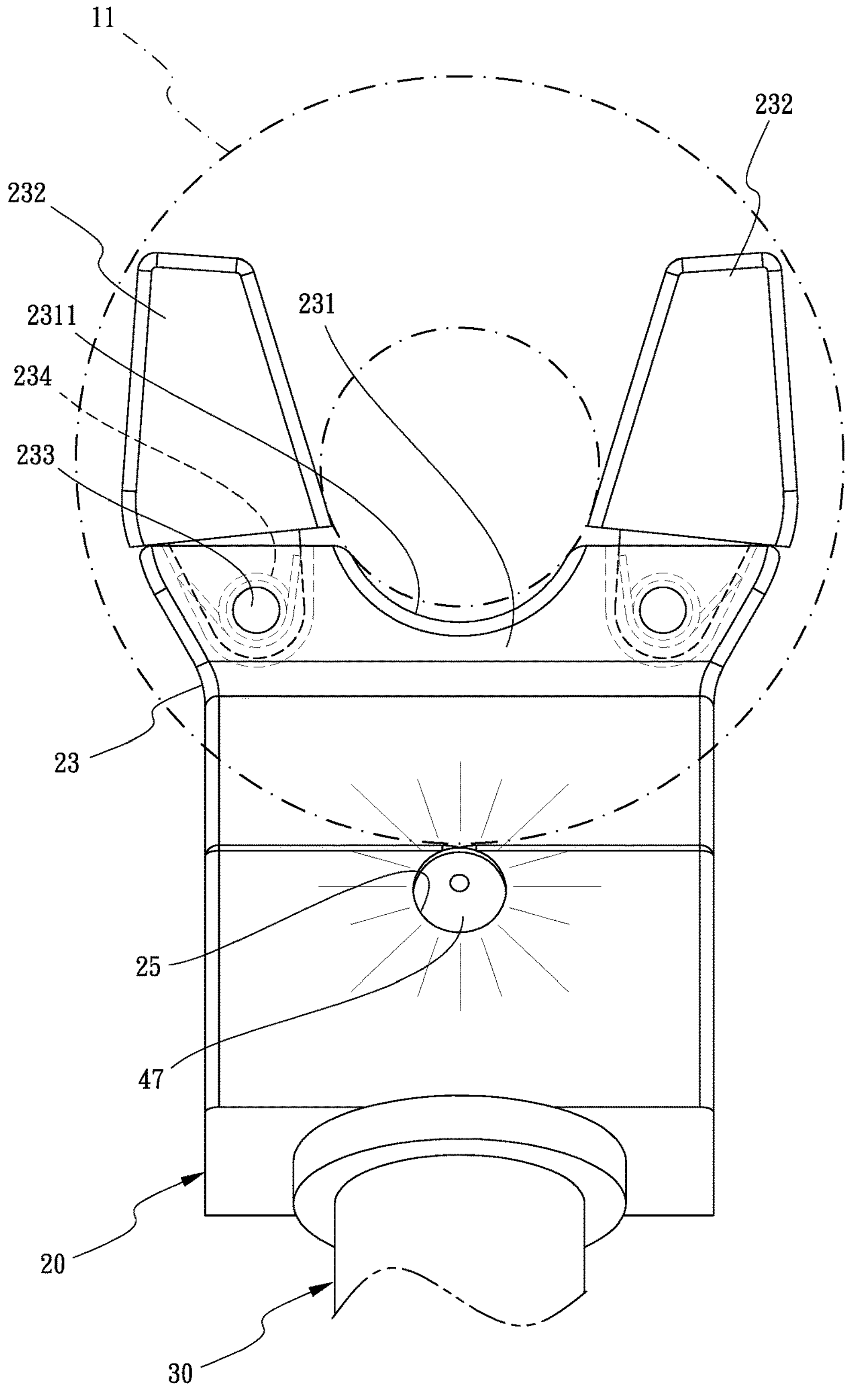
FIG. 7 shows that the door knob clamped between the two extensions of the yoke, and the two torsion springs bias the two extension toward each other.
Figure 8:
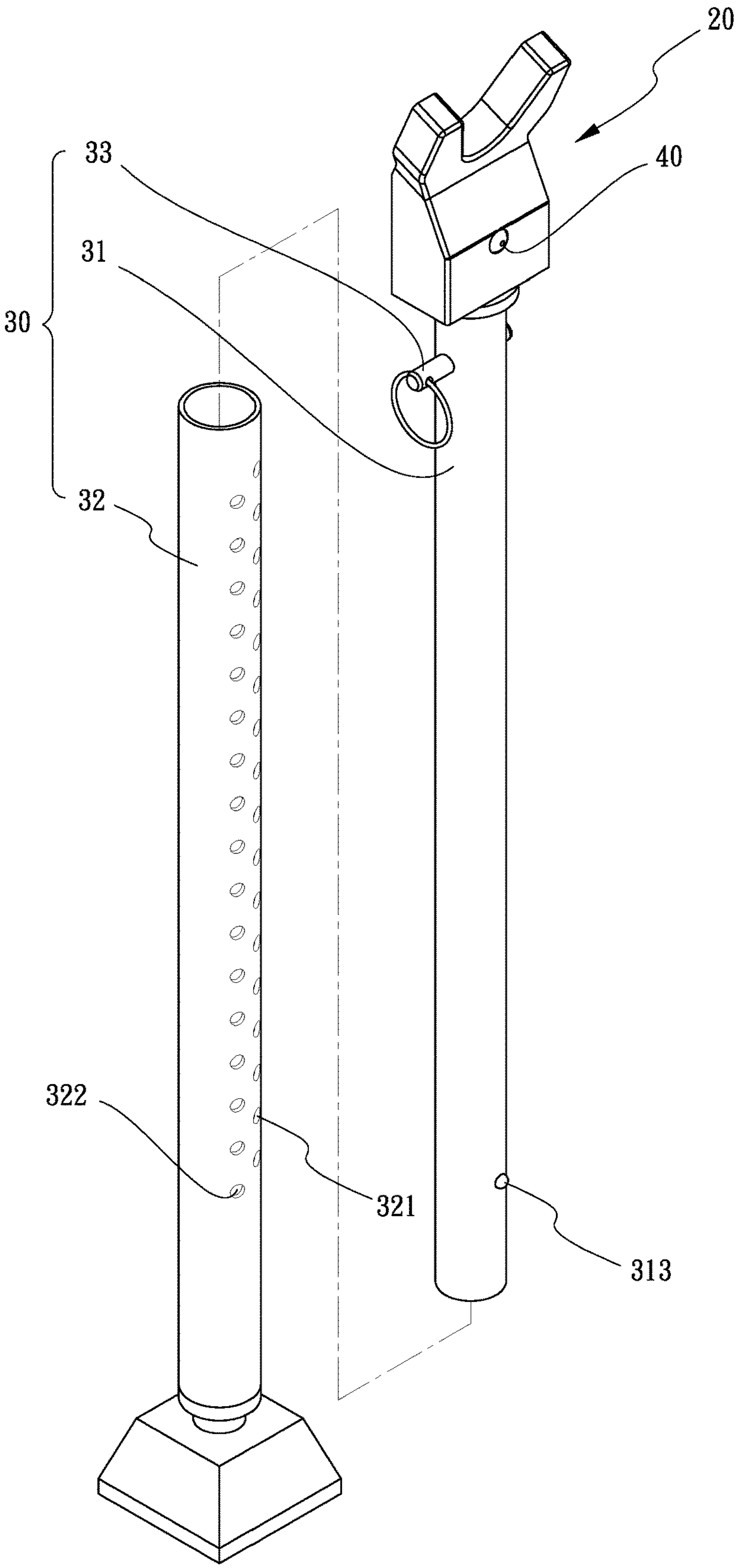
FIG. 8 shows the inner tube and the outer tube of the collapsible part of the door stop rod assembly of the present invention.

As shown in FIG. 7, the torsion springs 234 bias the two extensions 232 to normally pivot toward each other, so that when the door knob 11 is located between the two extensions 232 of the yoke 23, the two extensions 232 are forced to be pivoted away from each other first, and after the door knob 11 is located between the two extensions 232 and contacts the curved face 2311 of the yoke 23, the two extensions 232 pivot toward each other to clamp the door knob 11.

Figure 3:
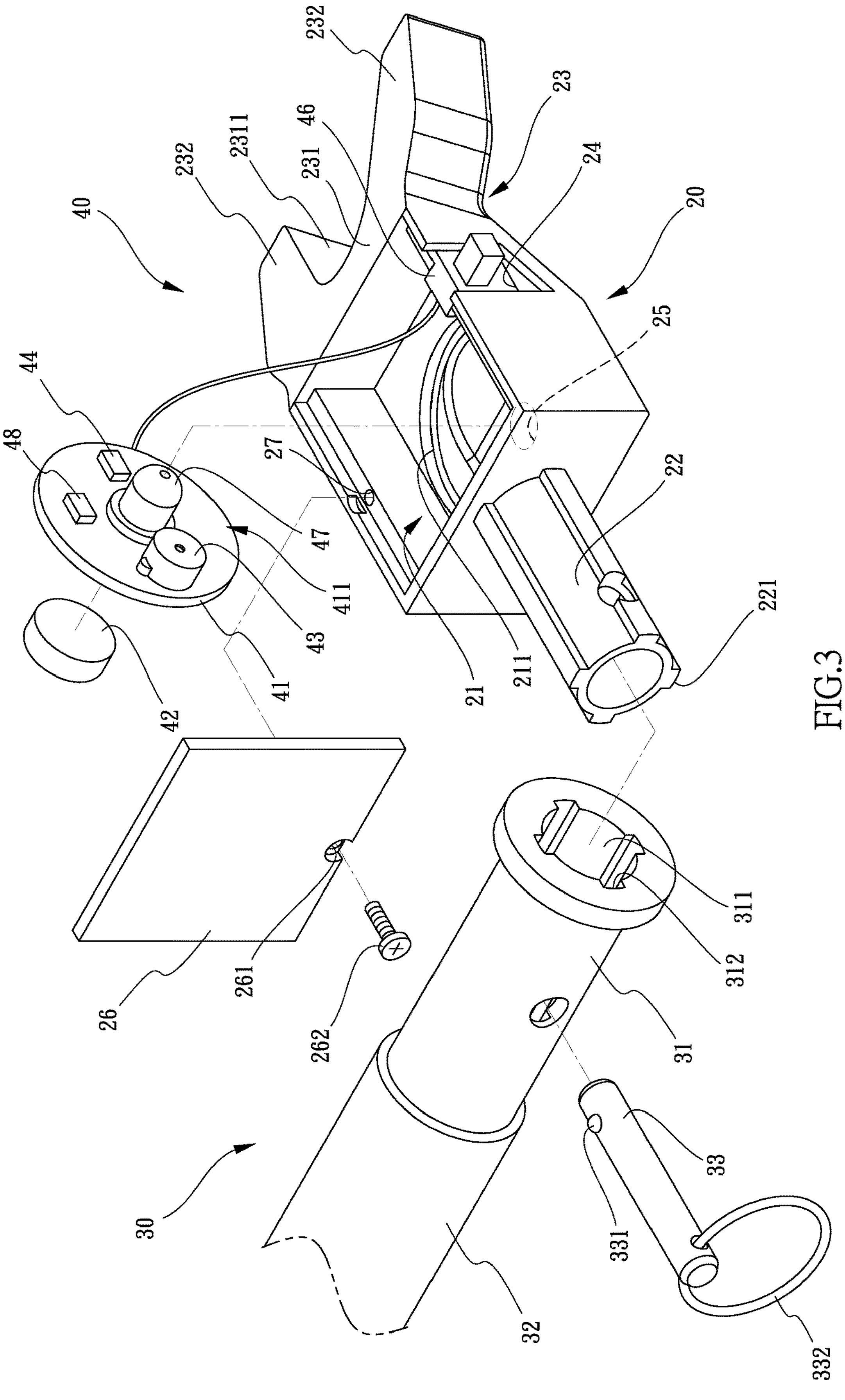
FIG. 3 is an exploded view of the door stop rod assembly of the present invention.
Figure 4:
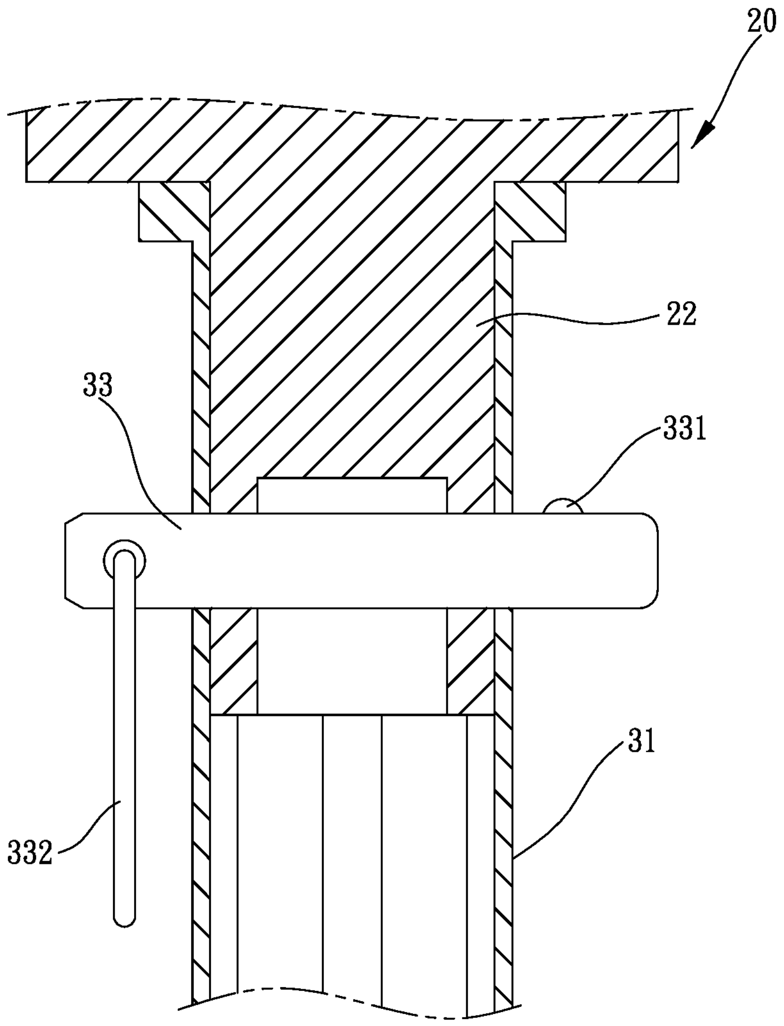
FIG. 4 is a cross sectional view, taken along line IV-IV in FIG. 1.
Figure 5:
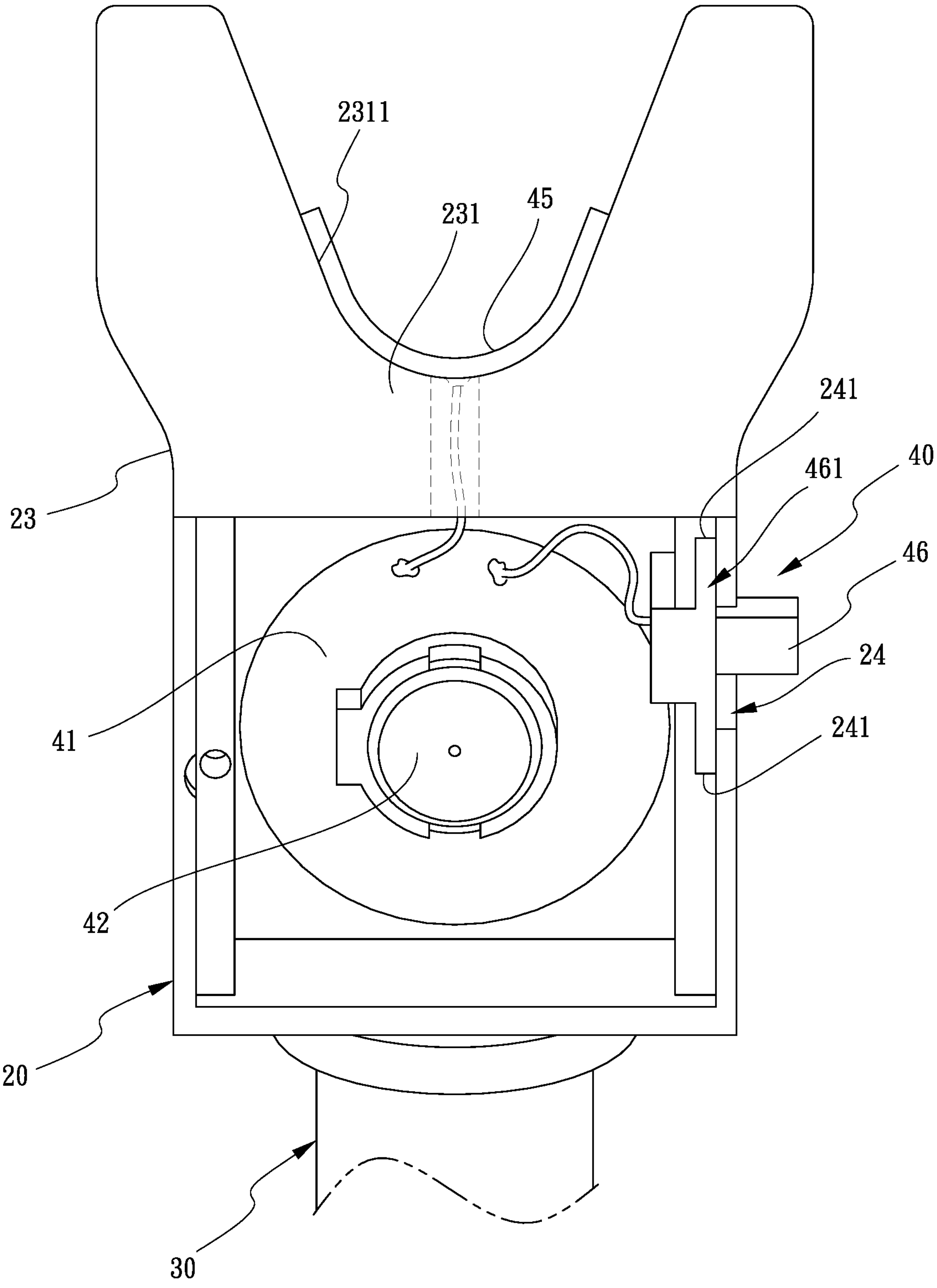
FIG. 5 shows the warning device located in the base of the door stop rod assembly of the present invention.
Figure 6:
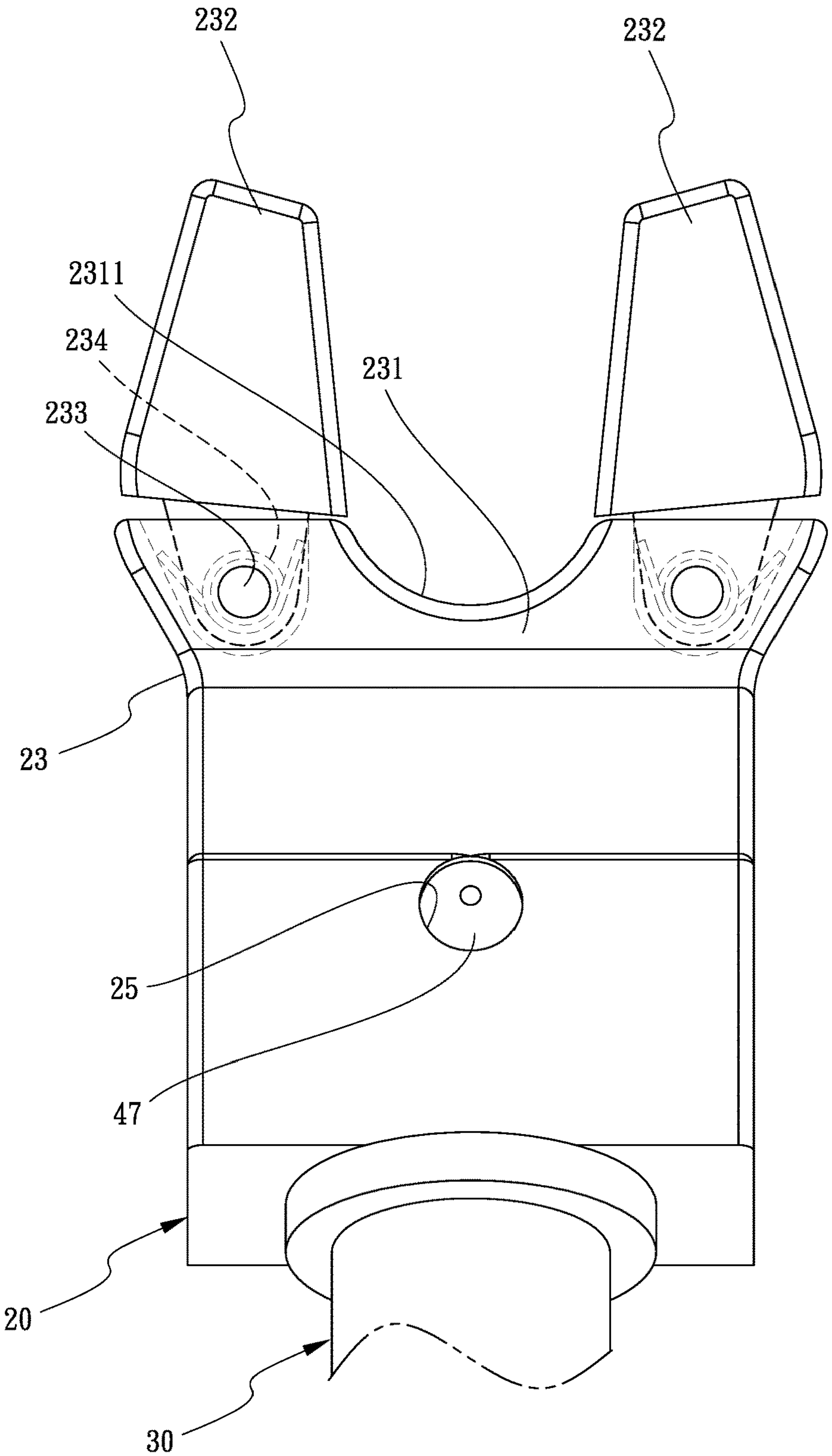
FIG. 6 shows that each of the extensions of the yoke is connected with a torsion spring and pivotable about a pivot corresponding thereto.

As shown in FIGS. 3 and 5, base board 461 of the switch 46 is inserted into the slots 241 so that the switch 46 is securely positioned.

The yoke 23 includes a notch 231 against which the door knob 231 contacts, and the notch 231 includes the curved face 2311 as mentioned above. The warning device 40 includes a static electricity sensor 48 and a conductive plate 45 electrically connected to the circuit 41. The conductive plate 45 is located at the curved face 2311 of the notch 231 of the yoke 23. The conductive plate 45 inducts static electricity from the door knob 11 due to exterior touch of the door knob 11 to activate the static electricity sensor 48, the circuit 41 activates the buzzer 43 to buzz. The door knob 11 is made of metal, and the conductive plate 45 located at the curved face 2311 directly contacts the door knob 11. When the unauthorized person touch the door knob 11 by his/her hand, the conductive plate 45 receives static electricity and triggers the static electricity sensor 48. Therefore, the circuit 41 activates the buzzer 43 to warn the persons in the room.

The base 20 includes a bore 25 which communicates with the room 21. The warning device 40 includes a light 47 located corresponding to the bore 25 and electrically connected to the circuit 41. The users can check the light 47 via the bore 25 to make sure that the warning device 40 is activated.

A cover 26 removably covers an opening of the room 21 of the base 20. A threaded hole 27 is formed along one side of the base 20. The cover 26 includes a sink hole 261. A screw 262 extends through the sink hole 261 and is connected to the threaded hole 27 to secure the cover 26 to cover the room 21 of the base 20. The head of the screw 262 is located within the sink hole 261 to prevent from hitting or scratching any object or person.

While we have shown and described the embodiment in accordance with the present invention, it should be clear to those skilled in the art that further embodiments may be made without departing from the scope of the present invention.

What is claimed is:

1. A door stop rod assembly comprising:

a base having a room defined therein, a neck extending from a first end of the base, a yoke connected to a second end of the base, a cut-out defined in one side of the base, a recess formed in an inner bottom of the room, two slots formed to two sides of a periphery of the cut-out;

a collapsible part including an inner tube and an outer tube, a first end of the inner tube retractably inserted into the outer tube, a second end of the inner tube connected to the neck of the base, a locking pin including a boss and a ring, the boss protruding beyond a periphery of the locking pin, the ring connected to one end of the locking pin, the locking pin extending through the inner tube and the neck, the inner tube located between the boss and the ring, multiple ridges extending axially from an outer periphery of the neck, the second end of the inner tube including a passage defined axially therein, multiple grooves defined axially in an inner periphery of the passage, the ridges of the neck slidably received in the grooves of the inner tube, a biased pin located in the inner tube and having an end piece protruding through an outer periphery of the inner tube, the outer tube having multiple first holes and second holes defined through a wall thereof, the first holes being arranged in a first row, the second holes being arranged in a second row which is parallel to the first row of the first holes, the second holes located alternatively between the first holes, the end piece of the biased pin protruding through one of the first and second holes, the yoke including two extensions, each of the two extensions being pivotably connected to the yoke by a pivot, each extension is connected to a torsion spring so that the two extensions are biased toward each other, and a warning device located in the room of the base and including a circuit, a power supply, a buzzer, a vibration detector and a switch, the circuit, the power supply, the buzzer, the vibration detector and the switch being electrically connected to each other, the circuit formed on a disk which is accommodated in the recess, the switch having a base board which is inserted into the two slots of the cut-out, when the vibration detector detects vibration from a door knob that the yoke of the door stop rod assembly contacts, the buzzer is activated to buzz.

2. The door stop rod assembly as claimed in claim 1, wherein the yoke includes a notch against which the door knob contacts, the notch includes a curved face, the warning device includes a static electricity sensor and a conductive plate electrically connected to the circuit, the conductive plate is located at the curved face of the notch of the yoke, the conductive plate inducts static electricity from the door knob due to exterior touch of the door knob to activate the static electricity sensor, the circuit activates the buzzer to buzz.

3. The door stop rod assembly as claimed in claim 2, wherein the base includes a bore which communicates with the room, the warning device includes a light located corresponding to the bore and electrically connected to the circuit.

4. The door stop rod assembly as claimed in claim 1, wherein a cover removably covers an opening of the room of the base, a threaded hole is formed along one side of the base, the cover includes a sink hole, a screw extends through the sink hole and is connected to the threaded hole to secure the cover to cover the room of the base.

* * * * *